United States Patent [19]

Krebs et al.

[11] Patent Number: 5,040,510
[45] Date of Patent: Aug. 20, 1991

[54] METHOD FOR CONTROLLING KNOCKING IN INTERNAL COMBUSTION ENGINES

[75] Inventors: Stefan Krebs, Regensburg; Sebastian Aiglstorfer, Mallersdorf-Pfaffenb, both of Fed. Rep. of Germany

[73] Assignee: Siemens Aktiengesellschaft, Munich, Fed. Rep. of Germany

[21] Appl. No.: 528,228

[22] Filed: May 23, 1990

[30] Foreign Application Priority Data

May 23, 1989 [EP] European Pat. Off. ........ 89109254.6

[51] Int. Cl.⁵ .......................... F02P 5/15; G01L 23/22
[52] U.S. Cl. ........................................ 123/425; 73/35
[58] Field of Search ............... 123/425, 435; 73/35; 364/431.08

[56] References Cited

U.S. PATENT DOCUMENTS

| 4,274,379 | 6/1981 | Iwata et al. | 123/425 |
| 4,356,551 | 10/1982 | Iwase et al. | 123/425 |
| 4,444,042 | 4/1984 | Bonitz et al. | 73/35 |
| 4,466,406 | 8/1984 | Hartung et al. | 123/425 |
| 4,565,087 | 1/1986 | Damson et al. | 73/35 |
| 4,699,106 | 10/1987 | Haraguchi et al. | 123/425 |
| 4,750,103 | 6/1988 | Toshimi et al. | 123/425 |
| 4,793,310 | 12/1988 | Komurasaki | 123/425 |

FOREIGN PATENT DOCUMENTS

| 3031511 | 4/1982 | Fed. Rep. of Germany . |
| 3415948 | 10/1982 | Fed. Rep. of Germany . |
| 3506114 | 9/1986 | Fed. Rep. of Germany . |
| 8415093 | 4/1986 | France . |

Primary Examiner—Tony M. Argenbright
Assistant Examiner—Robert E. Mates
Attorney, Agent, or Firm—Herbert L. Lerner; Laurence A. Greenberg

[57] ABSTRACT

A method for controlling knocking in internal combustion engines includes determining a measurement window for each ignition cycle. A sensor signal of a knock sensor is scanned within the measurement window at a predetermined scanning frequency to form scanning values. Digital knock values are determined as the mean value of a given number of the relatively highest scanning values. A knock threshold is formed from a noise value calculated by sliding mean-value formation from a given number of previous knock values. The digital knock values are compared with the knock threshold. The ignition angle is intermittently retarded whenever a knock value exceeds the knock threshold.

21 Claims, 2 Drawing Sheets

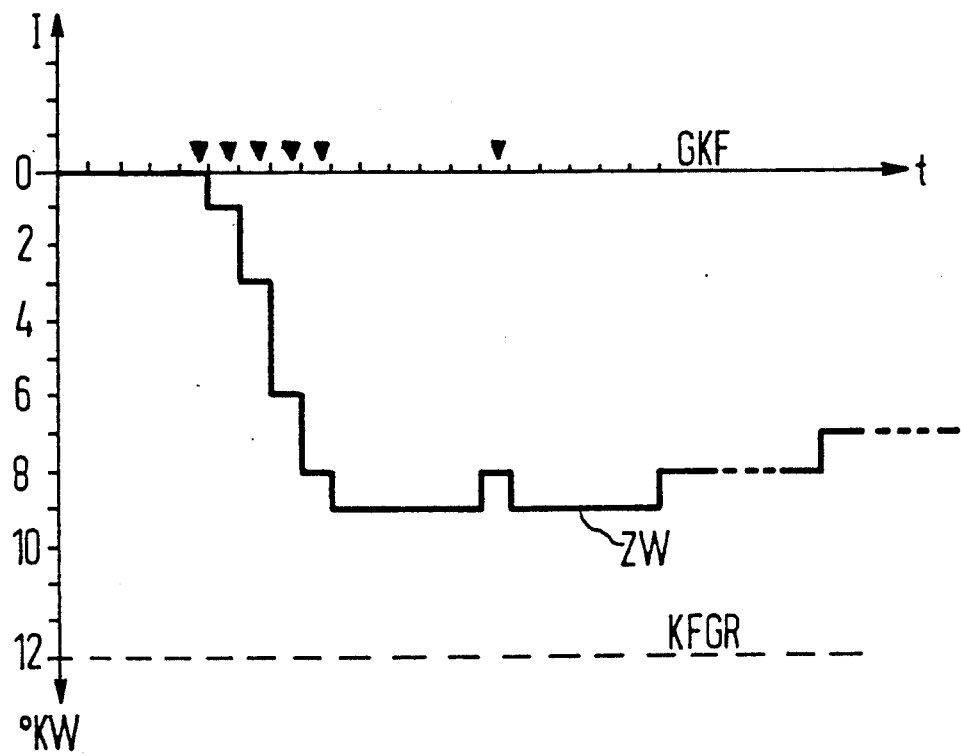

METHOD FOR CONTROLLING KNOCKING IN INTERNAL COMBUSTION ENGINES

The invention relates to a method for controlling knocking in internal combustion engines, wherein a sensor signal of a knock sensor is scanned within a measurement window that is predetermined for each ignition cycle in order to form scanning values, digital knock values are derived from the scanning values and compared with a knock threshold, and an intermittent retardation of the ignition angle is performed whenever a knock value exceeds the knock threshold.

Such a method is known from German Published, Non-Prosecuted Application DE-OS 34 34 823.

The known method describes an electronic performance graph ignition with superimposed knock control, in which a knock value is determined for each ignition cycle from the sensor signal of a knock sensor, and the sensor signal is amplified, filtered in a bandpass filter and then rectified. The thus-prepared sensor signal is then integrated during a measurement window synchronized with the crankshaft angle, and at the end of the measurement window the result of integration is converted into a digital value or knock value, which is then compared with a knock threshold. If the value exceeds he threshold, then the instant of ignition is "retarded" in the next ignition cycle.

One of the disadvantages of that kind of signal evaluation is that a large measurement window width (or duration) is needed in order to attain sufficiently great sensitivity. Furthermore, the width and the location of the measurement window in the ignition cycle have a direct influence on the knock value. Such factors preclude the free selection of the measurement window, such as in order to tune out or mask noise caused by knocking.

Although it is mentioned in the known method that the chronological location or duration of a measurement window can be set as a function of at least one operating parameter, that refers to an auxiliary measurement window which is located between the ignitions in a non-critical zone, in order to obtain a signal for controlling the gain of a regulating amplifier for the sensor signal. The location of the auxiliary measurement window in the ignition cycle has a very slight effect, but its duration has a direct effect, upon the outcome of measurement.

It is accordingly an object of the invention to provide a method for controlling knocking in internal combustion engines, which overcomes the hereinafore-mentioned disadvantages of the heretofore-known methods of this general type and in which the location and duration of the measurement window in the ignition cycle are variable within wide limits, without impairing the outcome of the measurement or variables derived from that outcome.

With the foregoing and other objects in view there is provided, in accordance with the invention, a method for controlling knocking in internal combustion engines, which comprises determining a measurement window for each ignition cycle, scanning a sensor signal of a knock sensor within the measurement window at a predetermined scanning frequency to form scanning values, determining digital knock values as the mean value of a given number of the relatively highest scanning values, forming a knock threshold from a noise value calculated by sliding mean-value formation from a given number of previous knock values, comparing the digital knock values with the knock threshold, and intermittently retarding the ignition angle whenever a knock value exceeds the knock threshold.

An advantage of the invention is that the measurement window can be shifted within wide limits and its duration can be varied without changing the measurement outcome, as long as the three highest scanning values remain within the measurement window. In this way, scanning values that are undesirable but not do originate in knocking can be removed from the measurement window as long as they do not chronologically coincide with the scanning values that are relevant to knocking.

The invention makes it possible to predetermine a measurement window having the variables of onset, scanning frequency and end or number of scanning values, for every operating point. The values can be stored in tables or performance graphs.

Operating points are known to be dependent on at least two operating parameters, namely the engine rpm and the engine load. Other operating parameters for these operating points and for other variables may be the engine or vehicle acceleration, the engine temperature, and so forth.

The knock value ascertained by means of the measurement window is not evaluated as engine knocking unless it exceeds a predetermined knock threshold. The knock threshold is likewise formed from knock values ascertained in previous ignition cycles. A noise value is calculated from a given number of previous knock values, by sliding formation of an average value. In the simplest case, the knock threshold is obtained from the noise value by suitable amplification. It is practical to multiply the noise value by a given factor that represents multiplicative influences on the engine noise, and to add a summand to this product that represents additive engine noise influences. The knock threshold can be arbitrarily varied and optimally adapted to the engine type in question by variously weighting the factor or summand.

In accordance with another mode of the invention, the factor and the summand can likewise be stored in characteristic curves or performance graphs that are dependent on operating parameters.

In accordance with a further mode of the invention, with an amplification that is dependent on at least one operating parameter, such as engine rpm, the sensor signal can also be controlled in an open or closed-loop manner in order to attain optimal utilization of the measurement range and of the limited resolution of the analog/digital converter. To this end, the gain can be stored in the form of a characteristic curve dependent on the engine rpm and delivered to the signal preparation circuit in the form of a pulse-width-modulated digital signal. It then also becomes possible to check the sensor for functional capability (minimum value of the sensor signal at a given amplification).

In accordance with an added mode of the invention, the method can be even further refined by providing at least one further knock threshold, which is ascertained in simple fashion from the ascertained knock threshold through multiplication by a given and preferably constant factor. Depending on which of these knock thresholds is exceeded by a knock value, the knock intensity of that knock value can be ascertained thereby. Depending on the knock intensity of a knock value, the ensuing retardation of the instant of ignition can be variably extensive.

In accordance with an additional mode of the invention, this also makes it possible to leave knock values that exceed a given knock threshold out of the calculation of the noise value. This prevents excessive engine knock from raising the knock thresholds.

In accordance with again another mode of the invention, in addition to a basic performance graph dependent at least on the engine rpm and engine load, a limit characteristic curve or limit performance graph may also be provided, in which values that are dependent on engine parameters are stored in memory for a maximum allowable retardation of the instants of ignition.

In accordance with a concomitant mode of the invention, optimal knock control can be attained if the method according to the invention is performed separately for each group of cylinders or for each individual cylinder of the engine.

Other features which are considered as characteristic for the invention are set forth in the appended claims.

Although the invention is illustrated and described herein as embodied in a method for controlling knocking in internal combustion engines, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

FIG. 3 is a graph of the course of the controlled angle of ignition over time.

Figure 1:
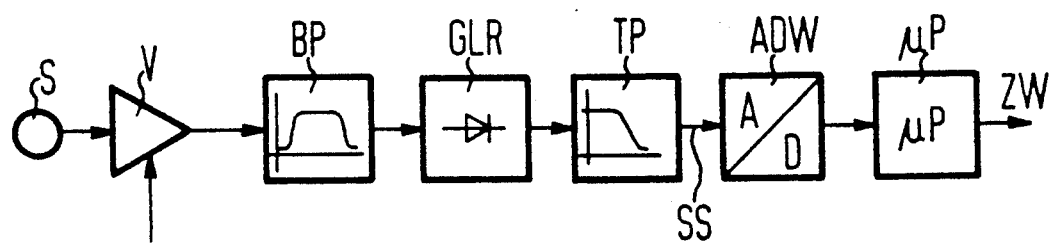
FIG. 1 is a block circuit diagram of a device for the preparation of a sensor signal.
Figure 2:
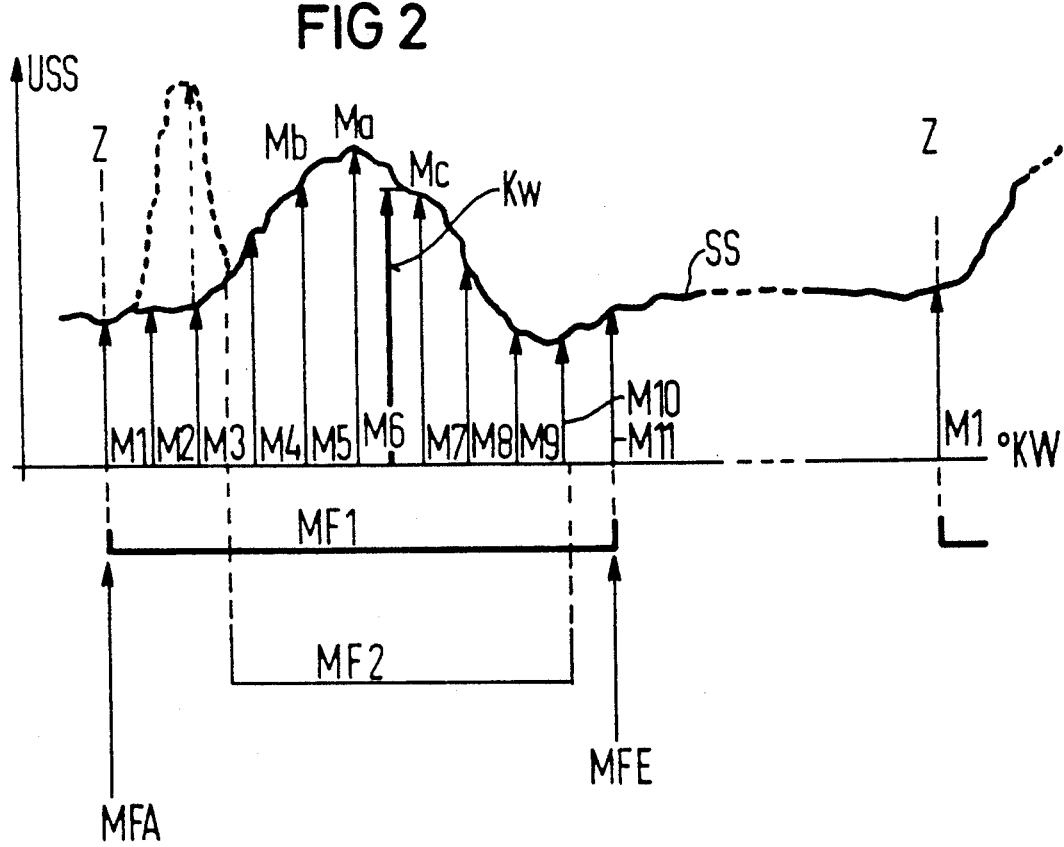
FIG. 2 is a graph pertaining to scanning of the sensor signal.

Referring now to the figures of the drawings in detail and first, particularly, to FIG. 1 thereof, there is seen a block circuit diagram including a knock sensor S, which is disposed at some suitable point along a cylinder of an internal combustion engine for issuing an output signal of the sensor being amplified in an amplifier V, filtered in a bandpass filter BP, rectified in a subsequent rectifier GLR, and finally smoothed in a low-pass filter TP. The output signal SS of the low-pass filter TP, which is also shown in FIG. 2, is the prepared sensor signal. The signal SS is digitized in an analog/digital converter ADW and then processed in a microprocessor $\mu P$ into a trigger signal for an ignition angle transducer of the cylinder in question.

FIG. 2 shows a typical amplitude course USS (ordinate) of the prepared sensor signal SS over a crankshaft angle KW (abscissa) between two ignitions Z.

At the onset of each ignition, a measurement window MFI is opened, which has an onset MFA that in this case coincides with the instant of ignition Z.

The onset MFA and end MFE of the measurement window MF1 are stored as a function of operating points in performance graphs. Each operating point is determined by at least the engine rpm n and engine load L. In other words, MFA, MFE = f(n, L).

Alternatively, the end of the measurement window can also be determined directly by a given number of scanning values. The scanning frequency f and the number of scanning values M can also be stored in memory in performance graphs or characteristic curves, with each being dependent on operating points. After being digitized, the measurement values M1–M11 obtained within the measurement window MFI are stored, for instance in a FIFO (first-in, first-out) memory, and are processed in succession. In this exemplary embodiment, the three highest values Ma, Mb and Mc are ascertained.

A mean value which is then formed from these three highest values, is applicable as a knock value Kw for the ignition cycle in question:

Kw = (Ma + Mb + Mc)/3.

Accordingly, the knock value Kw is the "mean maximum scanning value" in the combustion of the mixture in a cylinder following ignition.

The knock value Kw is not evaluated as engine knocking until it exceeds a given knock threshold KS.

FIG. 2 clearly shows that nothing changes in terms of the amount of the ascertained knock value Kw if the measurement window is narrowed down to MF2, for instance, in order to mask adulterations of the prepared sensor signal SS originating in other noise sources. The prepared sensor signal SS is represented in this case by dotted lines. This makes it simple to optimally adapt the measurement window to the particular operating point.

The knock threshold KS required for ascertained engine knocking is determined from knock values Kw of previous ignitions. To this end, a sliding mean value or so-called noise value GW is first formed from a given number x of the most recently ensuing knock values Kw. The number x may be dependent on the operating point (or only on the engine rpm) and on the acceleration of the engine crankshaft:

x = f(n, L, b).

The dependency on the crankshaft acceleration is useful in this respect because a mean value that is formed from few values during major acceleration (or deceleration) varies more quickly than if it is formed from a large number of values. On the other hand, the latter type of mean value is useful for stationary operation, in order to eliminate individual "mavericks", or freak values. In this exemplary embodiment, the number x can thus vary between approximately 2 and 25:

$$GW = \left[ \sum_{1}^{x} Kw(-x) \right] / x$$

The minus sign in the brackets is intended to refer to previous values. The thus-formed noise value GW is multiplied by a factor Km, which essentially takes into account multiplicative influencing variables such as changes in sensitivity of the knock sensor, changes in the signal amplification, and other signal transmission and signal damping effects of the engine.

A summand Ka which is also added to this product primarily covers additive influencing variables such as signal offset of the control electronics, mechanical interference signals of the engine, and others.

Accordingly, the knock threshold KS is formed from the noise value GW, the factor Km and the summand Ka. These variables can again be stored in memory in characteristic curves or performance graphs dependent on operating points:

$$KS = GW \cdot Km + Ka, \text{ where } Km, Ka = f(n, L).$$

Through a suitable selection of the factor Km and of the summand Ka, these elements can be weighted differently or eliminated from the equation, for instance by setting Ka=0. In practice, these variables are ascertained by trial and error and optimized before they are stored in memory in performance graphs. The variables Km and Ka raise the knock threshold KS far enough so that the knock values Kw do not exceed it during normal combustion without engine knocking.

In order to not only ascertain whether or not engine knocking is present, but also to permit some interpretation as to the intensity of engine knocking, other, higher knock thresholds are generated. In this exemplary embodiment, two other thresholds KS1, KS2 are generated by multiplying the knock threshold KS by factors that are constant in this embodiment (alternatively, for instance, they could be rpm-dependent or dependent on operating points instead). This makes it possible to distinguish three different knock intensities I from one another:

I1: $KS \leq Kw < KS1$,
I2: $KS1 \leq Kw < KS2$,
I3: $KS2 \leq Kw$, depending on whether the instantaneous knock value Kw has exceeded only the knock threshold KS, two knock thresholds KS and KS1, or all three knock thresholds KS, KS1 and KS2.

Accordingly, it is possible to provide for different reactions to engine knocking of various intensities.

This can be seen from FIG. 3, in which the course of the ignition angle ZW is plotted over time (abscissa).

On the ordinate, its intersection with the abscissa is equivalent to an ignition angle that is associated with the instantaneous operating point and stored in memory in a basic performance graph GKF. Ignition angles from this basic performance graph are used during engine starting, within a predetermined performance graph range (below given engine rpm and engine load values), and if the knock control fails.

Crankshaft angles in the retarding direction of adjustment, beginning at the instantaneous ignition angle of the basic performance graph GKF, are plotted downward in the ordinate direction. A broken line represents a value of a limit performance graph KFGR, which value is associated with the instantaneous value of the basic performance graph, for a maximally retarded adjustment of the ignition angle. This limit performance graph KFGR is also stored in memory as a function of operating points (for simplification, it can also be determined by a constant, which defines a constant interval from the basic performance graph GKF), so that two performance graph "mountain ranges", which are disposed one above the other at various intervals pertaining to the engine rpm and engine load, are stored in memory, and the values associated with the particular operating point and shown in FIG. 3 are drawn therefrom.

In this diagram, the knock intensity I is plotted upward in the ordinate direction and the abscissa is associated with a state in which knocking is not occurring. The ignition angle ZW is shifted toward "retardation" by one degree of the crankshaft angle during engine knocking (represented by small triangles) of the intensity I1, by two degrees of the crankshaft angle at the intensity I2, and by three degrees of the crankshaft angle at the intensity I3, maximally until the limit performance graph KFGR is reached.

After a given number of knock-free ignitions, the ignition angle is shifted back by a predetermined amount, in this case by one degree of the crankshaft angle toward "advance", and so forth, either until the basic performance graph GKF has been reached or until engine knocking occurs again.

The ignition angle is controlled continuously in this way.

We claim:

1. Method for controlling knocking in internal combustion engines, which comprises determining a measurement window for each ignition cycle, scanning a sensor signal of a knock sensor within the measurement window at a predetermined scanning frequency to form scanning values, determining digital knock values as the mean value of a given number of the relatively highest scanning values, forming a knock threshold from a noise value calculated by sliding mean-value formation from a given number of previous knock values, comparing the digital knock values with the knock threshold, and intermittently retarding the ignition angle whenever a knock value exceeds the knock threshold.

2. Method according to claim 1, which comprises determining the onset of the measurement window in dependence on at least one operating parameter.

3. Method according to claim 1, which comprises determining the scanning frequency in dependence on at least one operating parameter.

4. Method according to claim 1, which comprises determining the number of scanning values in dependence on at least one operating parameter.

5. Method according to claim 1, which comprises determining the end of the measurement window in dependence on at least one operating parameter.

6. Method according to claim 1, which comprises determining the given number of previous knock values for calculating the noise value in dependence on at least one operating parameter.

7. Method according to claim 1, which comprises multiplying the noise value with a factor being dependent on at least one operating parameter.

8. Method according to claim 1, which comprises adding to the noise value with a summand being dependent on at least one operating parameter.

9. Method according to claim 1, which comprises amplifying at least one of the sensor signal and the knock threshold with an amplification having a gain being dependent on at least one operating parameter.

10. Method according to claim 9, which comprises performing the amplification step with open-loop amplification.

11. Method according to claim 9, which comprises performing the amplification step with closed-loop amplification.

12. Method according to claim 1, which comprises determining the knock threshold in dependence on at least one operating parameter.

13. Method according to claim 1, which comprises multiplying the knock threshold by a predetermined factor for determining at least one further knock threshold.

14. Method according to claim 1, which comprises determining a knock intensity of a knock value by comparing the knock value with the knock threshold.

15. Method according to claim 1, which comprises excluding knock values exceeding a predetermined threshold when calculating the noise value.

16. Method according to claim 14, which comprises determining the amount of retardation of the ignition angle in dependence on the knock intensity of the knock value.

17. Method according to claim 1, which comprises defining a basic performance graph in dependence on at least two operating parameters, and determining the ignition angle from the performance graph.

18. Method according to claim 17, which comprises determining a limit characteristic curve in dependence on at least one operating parameter, and indicating the maximum allowable retardation of the ignition angle stored in memory in the basic performance graph with the limit characteristic curve.

19. Method according to claim 1, which comprises determining a limit performance graph in dependence on at least two operating parameters, and defining the limit performance graph as a value for a maximum allowable retardation of the ignition angle.

20. Method according to claim 1, which comprises dividing cylinders of an engine into groups each including at least one cylinder, and performing the method separately for each group.

21. Method according to claim 1, which comprises forming a product by multiplying the noise value with a factor being dependent on at least one operating parameter, and adding to the product a summand being dependent on at least one operating parameter.

* * * * *